(12) United States Patent
Tung et al.

(10) Patent No.: US 10,110,425 B2
(45) Date of Patent: *Oct. 23, 2018

(54) DIFFERENTIATED SERVICE-BASED GRACEFUL DEGRADATION LAYER

(71) Applicant: Accenture Global Services Limited, Dublin (IE)

(72) Inventors: Teresa Tung, San Jose, CA (US); Shaw-Yi Chaw, San Jose, CA (US); Qing Xie, Chicago, IL (US); Qian Zhu, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 539 days.

This patent is subject to a terminal disclaimer.

(21) Appl. No.: 14/706,460

(22) Filed: May 7, 2015

(65) Prior Publication Data
US 2015/0244563 A1 Aug. 27, 2015

Related U.S. Application Data

(62) Division of application No. 13/432,478, filed on Mar. 28, 2012, now Pat. No. 9,195,511.
(Continued)

(51) Int. Cl.
*G06F 15/167* (2006.01)
*H04L 12/24* (2006.01)
(Continued)

(52) U.S. Cl.
CPC .......... *H04L 41/069* (2013.01); *G06F 9/5072* (2013.01); *H04L 41/5016* (2013.01);
(Continued)

(58) Field of Classification Search
CPC ..... H04L 41/0213; H04L 41/22; H04L 41/12; H04L 29/08072; H04L 29/06; H04L 29/0809; H04L 29/08144
See application file for complete search history.

(56) References Cited

U.S. PATENT DOCUMENTS 6,542,468 B1 * 4/2003 Hatakeyama ........... H04L 45/08
370/238
7,653,668 B1 * 1/2010 Shelat ................. G06F 11/2094
707/610
(Continued)

OTHER PUBLICATIONS

Zheng Junsheng et al., The Research on Web Page Design based on DIV+CSS, Computer Developing and Application, Sep. 2008, 6 pages.
(Continued)

*Primary Examiner* — Dhairya A Patel
(74) *Attorney, Agent, or Firm* — Brinks Gilson & Lione

(57) ABSTRACT

The differentiated service-based graceful degradation layer (DSGDL) allows cloud-based architectures to operate through and recover from periods of limited capability. The DSGDL protects and continues serving higher priority requests with the best possible response even as the underlying cloud-based services deteriorate. The DSGDL offloads lower priority requests to lower-grade secondary capability that can be dynamically provisioned in order to reserve the best capability for maintaining high priority service (e.g., by re-directing lower priority requests to a slightly out-of-date cached dataset, and reserve the primary consistent database for higher priority requests). The DSGDL 1) implements an overlay network over existing cloud services to route and enforce priority requests, and 2) provisions on-demand computing nodes and sites to provide secondary capability for service requests as needed.

14 Claims, 10 Drawing Sheets

Related U.S. Application Data

(60) Provisional application No. 61/606,661, filed on Mar. 5, 2012.

(51) Int. Cl.
　　*G06F 9/50*　　(2006.01)
　　*H04L 29/08*　　(2006.01)
　　*H04L 12/26*　　(2006.01)

(52) U.S. Cl.
　　CPC .......... *H04L 43/16* (2013.01); *H04L 67/1008* (2013.01); *H04L 67/1097* (2013.01); *H04L 67/322* (2013.01); *G06F 2209/5021* (2013.01)

(56) References Cited

U.S. PATENT DOCUMENTS

| | | | | |
|---|---|---|---|---|
| 7,747,662 | B2 * | 6/2010 | Vivekanand | H04L 67/322 707/822 |
| 8,185,912 | B1 * | 5/2012 | Leonard | G06F 9/546 709/226 |
| 2002/0019234 | A1 * | 2/2002 | Wright | H04M 3/36 455/450 |
| 2002/0087648 | A1 * | 7/2002 | Petrovykh | G06Q 10/107 709/206 |
| 2003/0033461 | A1 * | 2/2003 | Malik | G06F 13/18 710/107 |
| 2005/0089053 | A1 * | 4/2005 | Zhu | H04M 3/5191 370/412 |
| 2007/0183320 | A1 * | 8/2007 | Chen | H04L 47/527 370/229 |
| 2008/0071947 | A1 * | 3/2008 | Fischer | G06F 13/24 710/48 |
| 2009/0248917 | A1 * | 10/2009 | Kalos | G06F 3/061 710/39 |
| 2010/0115606 | A1 * | 5/2010 | Samovskiy | H04L 12/4641 726/15 |
| 2010/0131672 | A1 * | 5/2010 | Karaoguz | H04L 45/00 709/238 |
| 2010/0262695 | A1 | 10/2010 | Mays et al. | |
| 2011/0131309 | A1 * | 6/2011 | Akiyama | H04L 12/14 709/223 |
| 2011/0138048 | A1 | 6/2011 | Dawson et al. | |

OTHER PUBLICATIONS

Second Office Action issued in Chinese Application No. 201210098780.9 dated Mar. 25, 2015, 14 pages.
European Patent Office, Office Action from European Application No. 13157880.9 dated May 7, 2018, 6 pages.

* cited by examiner

DIFFERENTIATED SERVICE-BASED GRACEFUL DEGRADATION LAYER

CROSS-REFERENCE TO RELATED APPLICATIONS

This is a divisional application of U.S. patent application Ser. No. 13/432,478, filed on Mar. 28, 2012, which claims the benefits of provisional application 61/606,661, filed on Mar. 5, 2012, the content of both of which are hereby incorporated by reference in its entirety for all purposes.

TECHNICAL FIELD

The present description relates to how to efficiently and effectively implement a way to manage performance degradation in cloud-based architectures. This description also relates to how to leverage differentiated needs of users and service requests in cloud-based architectures to provide services during performance degradation without modifying the services.

BACKGROUND

The promise of "cheaper" and "faster" IT services encourages enterprises to adopt cloud computing. System reliability remains important but system reliability is now met without requiring dedicated hardware. Instead, availability goals rely on commodity cloud components that may be 3rd party operated and possibly individually less reliable. As such, cloud-based systems must be aware of potential issues and seamlessly distribute services and data to maintain availability guarantees. A cloud-based system's cycle of failure-detection and recovery becomes the norm throughout which different components in the architecture must adapt and be resilient. During periods of limited capability, not all requests can be accommodated at the usual level of service.

Traditional approaches to maintain system reliability are highly engineered brittle solutions (e.g., provisioning a known fixed set of resources ahead of time) and use expensive specialized hardware (e.g., hardware load balancing equipment and high speed interconnects). When traditional architectures experience a higher demand in requests that overwhelms the capacity of the existing services, the experience of all requests degrade equally because there is no mechanism to consider the importance (priority) or differentiated needs of service requests and/or sessions/users. Traditional approaches redirect sessions equally when a site is down, and thereby may overwhelm remaining services resulting in poor quality of service (QoS) for all. Traditional approaches use static routing so that when a computing node is lost, all subsequent requests are routed through a particular site and their performance/QoS suffers equally. When traditional architectures experience high demand in a service tier (e.g., static webpage servers, application-logic servers, or database server tiers), service requests directed to the tier suffer from similar service degradations. Traditional architectures often use a two site configuration (e.g., hot-hot or master-slave) that maintain consistency (e.g., primary system and mirror system) via high speed data connections. Due to cost, network bandwidth, and network latency issues, such configurations to achieve redundancy are often limited to a metro cluster (e.g., within 100 km between sites or 5 millisecond communication delay). Unfortunately, traditional two site configurations do not provide for protection from geographical events (e.g., an earthquake causing widespread service outage over a 100 km radius disaster zone).

In today's cloud-based architectures, users and service requests experience the same slow service and outage when demand is high or capability degrades (e.g., performance degradation). The cloud model does not provide a way for specialized designs and/or hardware (e.g., load balancer) to be implemented directly within each service in order to prioritize users and transaction types in order to gracefully degrade.

SUMMARY

The differentiated service-based graceful degradation layer (DSGDL) implements a system and method that includes one or more memories coupled to a processor. The one or more memories include a set of priority queues, and priority queue thresholds used to trigger dynamic rerouting and/or provisioning of secondary service capability, user identifiers that uniquely identify the user types and/or differentiated request types, and at least one service, including a primary service provided by a primary system. The DSGDL receives differentiated classes of requests for at least one service. The primary system and/or a secondary system (e.g., that provided by a secondary site) may provide services over a cloud computing environment. The services may use data maintained by the primary system (e.g., stored on the primary service). The DSGDL receives and/or identifies a plurality of transaction types or differentiated classes for the service requests, and determines an availability status of the service. Based on the determined or forecasted service availability, the DSGDL dynamically provisions one or more secondary systems. The one or more secondary systems may include: at least one cache system, wherein the cache system is configured to operate with older copies of the data stored in the primary service; at least one logging system configured to store requests for data changes intended for updating data stored in the primary service; or at least one mirror system including a version of the data stored in the database of the service; or at least one related system configured to provide at least a portion of the service offered by the primary system; or any combination thereof. The DSGDL dynamically routes the transaction types based on the user classes, the transaction types, and/or the availability status of the service to the primary system, or one or more secondary systems, or both.

Other systems, methods, and features will be, or will become, apparent to one with skill in the art upon examination of the following figures and detailed description. It is intended that all such additional systems, methods, and features be included within this description, be within the scope of the disclosure, and be protected by the following claims.

BRIEF DESCRIPTION OF THE DRAWINGS

The differentiated service-based graceful degradation layer (DSGDL) may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
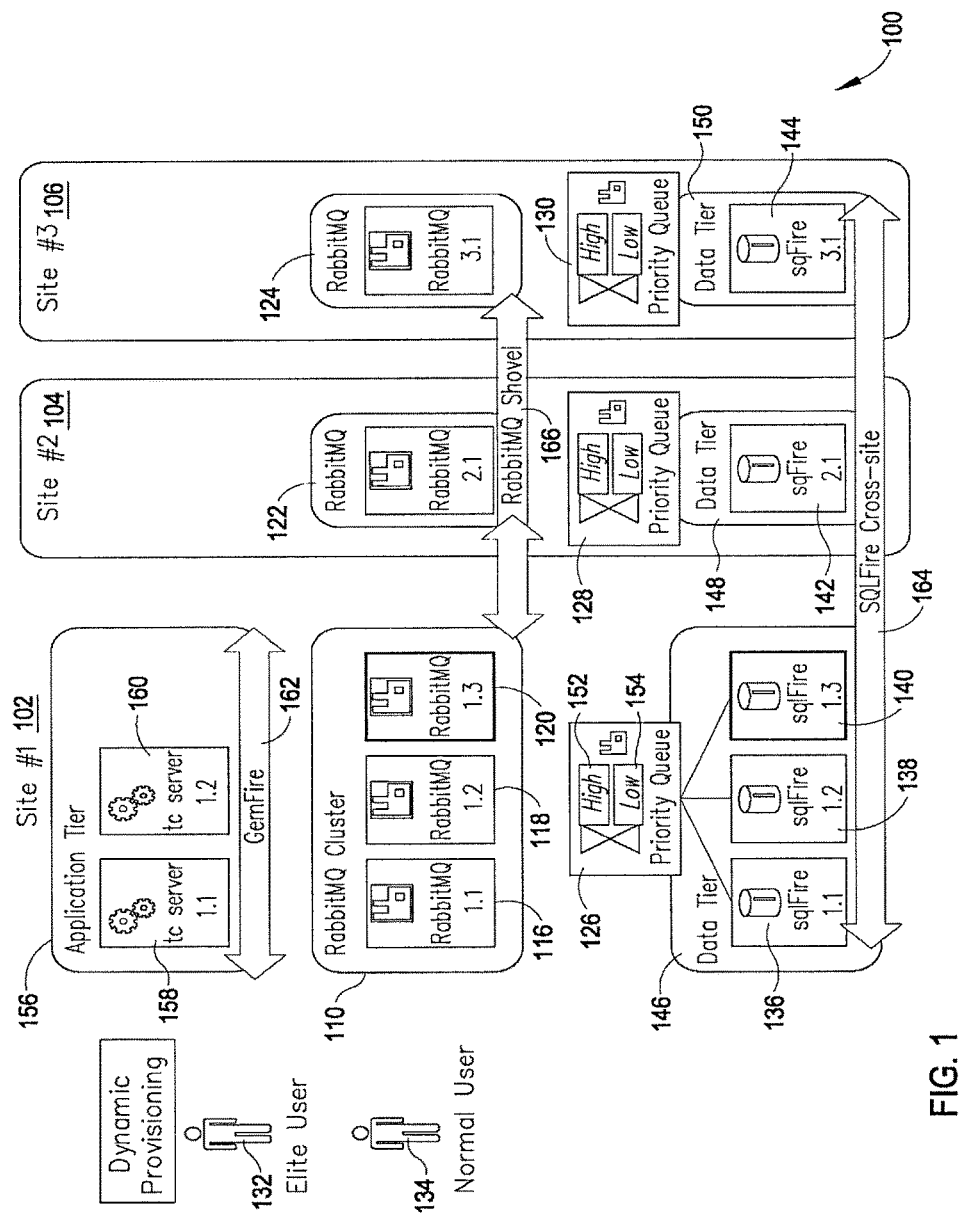
FIG. 1 shows an architecture diagram of the differentiated service-based graceful degradation layer (DSGDL).

The principles described herein may be embodied in many different forms. Not all of the depicted components may be required, however, some implementations may include additional, different, or fewer components. Variations in the arrangement and type of the components may be made without departing from the spirit or scope of the claims as set forth herein. Additional, different or fewer components may be provided.

The differentiated service-based graceful degradation layer (DSGDL) implements a capability above the services that leverages the cloud-based architectures to augment the availability of services. Computing environment failures are expected to occur and service demand is difficult to predict. As a result, available services may sometimes be overwhelmed by ad-hoc outages and very high demands. The DSGDL gracefully handles service degradation to minimize and avoid catastrophic outages. The DSGDL allows services to degrade in a way that protects users, traffic types, and transaction processing requirements according to a differentiated assignment. The DSGDL uses adaptive logic and empirical modeling to tune the parameters for triggering and identifying other appropriate actions to mitigate service degradation. The DSGDL provides a way to satisfy additional demand and gracefully handle performance degradations. The DSGDL provides differentiated service-based graceful degradation so that 1) higher priority requests experience the best available service, and 2) lower priority requests are handled via alternate secondary services that are dynamically provisioned according to the differentiated requirements (e.g., delay sensitive, consistency sensitive) of the lower priority requests.

The DSGDL may be implemented in different modes. An organization (e.g., a retailer) may implement the DSGDL in the computing architecture (e.g., data center of the organization), and/or an infrastructure provider and/or cloud broker service may implement the DSGDL to provide granularities of service provided by the DSGDL. A $3^{rd}$ party may also implement the DSGDL (offering the DSGDL as a service) on behalf of an organization (e.g., retailers). The DSGDL overlay and DSGDL interface plug-in may be implemented for any number of sites and services where needed without modifications to the services. Underlying services provide core functionality and may be implemented by 3rd parties (e.g., implemented on top of Infrastructure-as-a-Service, Platform-as-a-Service, and/or Software-as-a-Service): 1) allowing these services to scale within, and beyond the data center enables the augmentation of existing services and the provisioning of secondary options; and 2) providing on-demand procedures to use when the primary service degrades.

The DSGDL provides cloud-based architectures an overlay network (e.g., a network of messaging servers that provide AMQP-compliant queuing service such as VMWare's RabbitMQ® offering) implemented on top of another network (e.g., network of services) in order to control features such as routing and quality of service. The DSGDL overlay combines a variety of cloud-based services (e.g., public services and private services, or a composition of different $3^{rd}$ party vendor cloud offerings) and controls differentiated and dynamic routing without changing the implementation of the underlying services.

The DSGDL recognizes that for many enterprise applications, not all requests are created equal and the requests have different quality of service (QoS) requirements. For example, requests from elite customers, (e.g., members of a corporate rewards program such as Amazon Prime® or airline status members) may be more important than those requests from normal users. Similarly, requests from mobile devices may favor faster replies with less content as compared with those originating from higher powered computers (e.g., smaller images for mobile devices). Also, for an inventory service, shopping cart check-out requests require consistent views (e.g., synchronized data—consistent transaction type) even with increased delays, as compared to browsing requests (e.g., available transaction type) that are time-sensitive with available guarantees that may function with less data consistency. The service requestor may also add protections to work with the DSGDL based on transaction types: a.) Available requests—upon time-out and all results are presented (e.g., after 5 seconds, all searched items should be returned); and b.) Consistent requests—upon time-out, the requests are retransmitted. When a primary service (e.g., inventory service) overloads, the DSGDL provides a way to continue serving requests so that differentiated needs of transaction types and classes are met. The DSGDL prioritizes access for consistent transaction type requirements over service requests with available transaction type requirements, and prioritizes elite users over normal users. Available transactions are latency sensitive, but can accommodate inconsistency. As the primary service overloads, the primary service's ability to service requests eventually slows to the point where the primary service no longer satisfies the latency requirements of available transactions. Consistent transactions must maintain consistency, but can accommodate longer latency. The DSGDL may predefine transaction types (e.g., a data query request is an available type, and database update request is a consistent type). The terms query and update are technical terms that mean reads and writes, respectively. Alternatively, the transaction types may be assigned on-the-fly (e.g., dynamically) by the request originator (e.g., specify preference for a larger or small image size based on the capability in the client system).

FIG. 1 shows an architecture diagram 100 of the differentiated service-based graceful degradation layer (DSGDL). FIG. 1 shows scaling within a site 102 and scaling beyond sites to additional sites (104, 106, 108). The architecture diagram 100 of the DSGDL implements an overlay (e.g., via RabbitMQ® clusters that are VMware's implementation of the Advanced Message Queuing Protocol or AMQP) (110, 112, 114) comprising virtual machines (116, 118, 120, 122, 124) that implement and monitor priority queues (126, 128, 130) and route service requests for users (132, 134) based on differentiation rules (e.g., thresholds that trigger routing schemes). Priority queues (126, 128, 130) sit in front of each underlying service tier/data tier (e.g., worker nodes) corresponding to services (136, 138, 140, 142, 144) within a site. Each service subscribes to a set of priority queues. Each worker node (136, 138, 140, 142, 144) within a service tier (data tier) (146, 148, 150) consumes from the shared high and low priority queues (152, 154). A set of priority queues may include any number of priority queues including a low priority queue, a high priority queue, and/or a medium priority queue, or any gradation and combination thereof.

The DSGDL is an overlay (e.g., RabbitMQ® clusters of virtual computing machines) implemented between the application tier 156 and the data tier (146, 148, 150) in a cloud-based architecture. The DSGDL may be implemented as an overlay across all service tiers (e.g., client, web, application, and data tiers). The DSGDL dynamically implements routing rules based on the user type (132, 134), service request and priority queue indicating performance degradation. The DSGDL architecture may be implemented using VMware's® vFabric and vCenter, tcServer (front-end servers) (158, 160) with GemFire® that replicates session state 162, and RabbitMQ's AMQP messaging service on top of which the DSGDL implements the priority queues, monitoring, dynamic triggers, and label-switched routing. DSGDL may use VMware's® SQLFire to enable intra-site and inter-site data replication 164 (e.g., copies and synchronizes primary data). GemFire® is a distributed data management platform providing dynamic scalability, high performance, and database-like persistence. RabbitMQ® is an efficient, highly scalable (e.g., across sites 166), and easy-to-deploy queuing software that makes handling message traffic virtually effortless. SQLFire® is a memory-optimized distributed SQL database delivering dynamic scalability and high performance for data-intensive modern applications.

The DSGDL may be implemented with VMware's® GemFire® so that in the event a front end server 158 is lost at the application tier 156, the session state may be preserved across front-end nodes (158, 160). In this way, once a user has been identified by the DSGDL as a particular user type, when the user logs back in the user's user type is preserved and used by the DSGDL to determine how to route the user and the user's service requests. One of skill in the art will appreciate that the examples described above are non-limiting, i.e., other techniques may be used to implement the DSGDL without departing from the scope of the disclosure.

For example, a user who has entered credit card information does not need to re-enter the data in the event when an application tier server fails midway through the process. In another example, where a user begins to login and/or logged into an application and the server hosting the application fails, the user's user type determined by the DSGDL is preserved because the user session is seamlessly transferred to another server so that when the user logs back in on another machine, the system can continue the users session. The DSGDL uses the previously identified user type in order to determine how to route service requests for the user.

Figure 2:
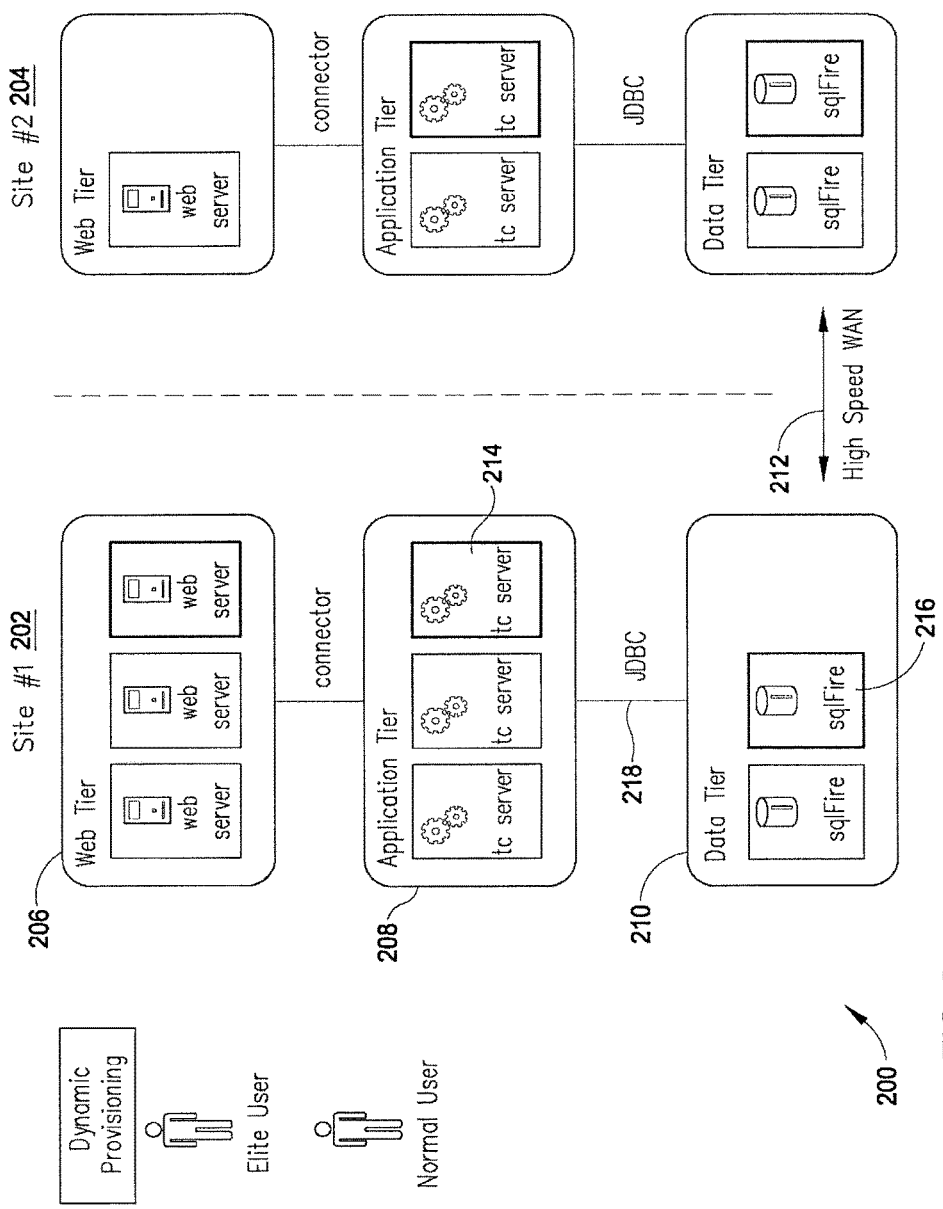
FIG. 2 shows an architecture diagram of a traditional service continuity and recovery implementation.

FIG. 2 shows an architecture diagram 200 of a traditional service continuity and recovery implementation. A traditional architecture typically provides a secondary or slave site 204 for service continuity lost by a primary site (e.g., master site 202). A traditional architecture deployment to provide high-availability uses two sites (e.g., a primary site 202 and a secondary site 204—metro site; data centers). The secondary site may provide a less consistent data view (e.g., a less current or synchronized view of the database contents) than the primary site (e.g., the single voice of truth). The two sites (e.g., a primary site 202 and a secondary site 204—metro site) are typically within 5 ms to 10 ms delay (e.g., Internet delay) or approximately 100 km geographical distance. The reason to locate the secondary sites (e.g., metro sites) within particular time delay tolerances is to achieve better data synchronization of the secondary sites (e.g., metro site) with the primary voice of truth (e.g., primary site). Accordingly, a user accessing a secondary site may experience data consistency delays. In the event a user is routed to a site that is beyond the distance of a metro site, for example beyond a 10 ms delay (e.g., Internet delay) or more than 100 km geographical distance, the data inconsistency becomes more apparent. Typically, data at the secondary sites (e.g., cache systems) may not be as consistent as data at the primary site due to communication delays.

In traditional architectures, once a user enters the web tier 206, traffic is directed to the application tier 208 and then to the data tier 210. During normal operation in the traditional environment, traffic is uniformly routed to the appropriate tier (206, 208, 210) on the primary site 202, and when a failure occurs at the primary site 202 the users connected to and transactions occurring on the primary site 202 fail over (212) to the metro site (e.g., the secondary site 204).

When demand overwhelms capacity (e.g., when a failure occurs or demand increases) at the primary site and the primary site service capability degrades to the point where the service capability can no longer fulfill the requirements of all the requests, the DSGDL re-directs normal users 134 to one or more secondary sites (e.g., secondary data centers), while maintaining connections for the elite users 132 and particular transaction requirement types (e.g., consistent transaction types and available transaction types) to the primary site whenever possible in order to access the single voice of truth and avoid data inconsistencies.

The DSGDL may be implemented by identifying (e.g., locating) the interfaces at the front-end server nodes 214 in the application tier 208 and at the worker nodes 216 in the data tier 210 to include the DSGDL logic. Implementing the DSGDL in an existing environment, the web tier 206, application tier 208, and data tier 210 may require explicit code modifications by software engineers or utilize software engineering frameworks (e.g., software design patterns in the form of wrappers to augment monolithic code with web-service capabilities). The DSGDL logic may replace the Java database connectivity (JDBC) 218, for example, used in traditional architectures, between the application tier 208 and the data tier 210. Alternatively, the DSGDL may be implemented by adding a DSGDL interface on top of services that implement a data-interchange format (e.g., Java Script Object Notation JSON).

Figure 3:
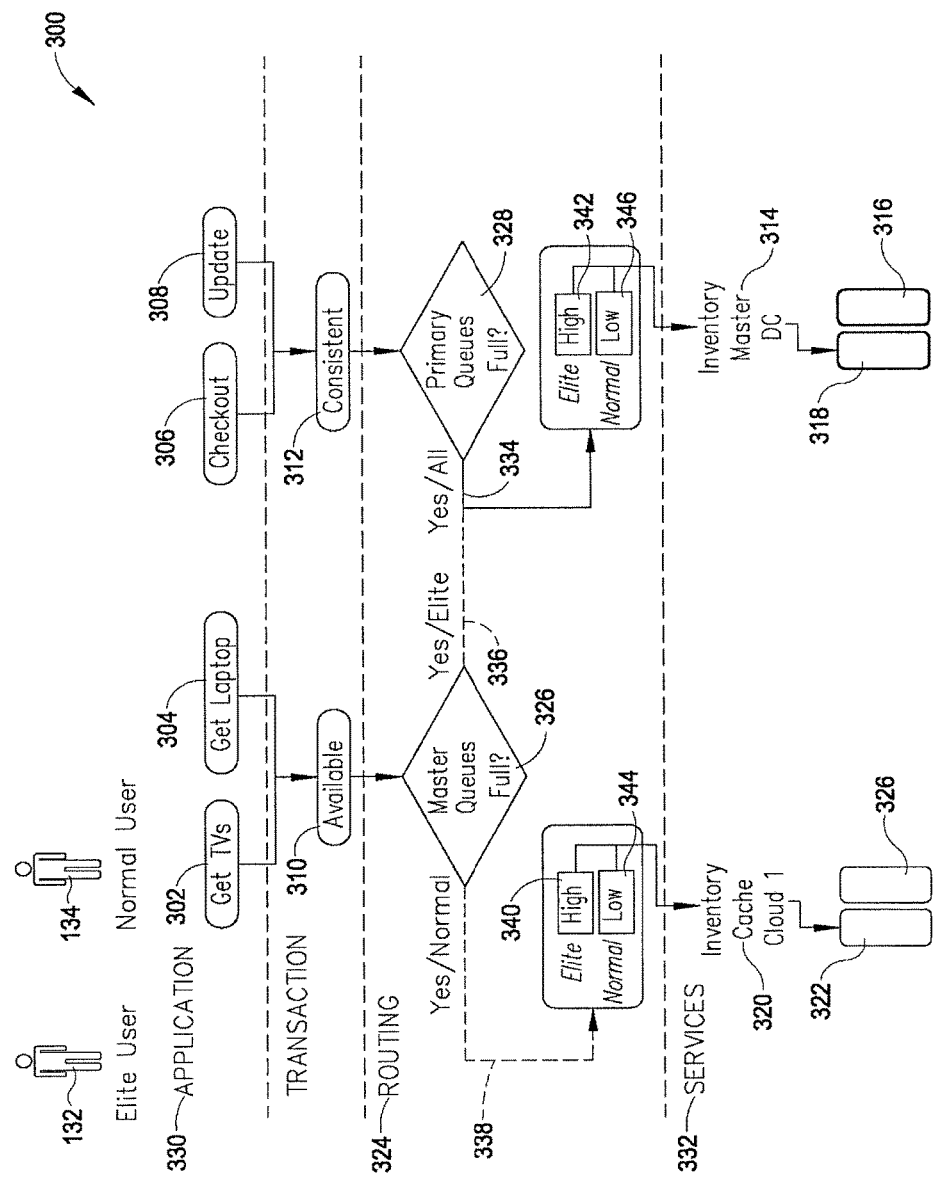
FIG. 3 shows a routing scheme the DSGDL may use when a normal user available transaction type threshold is exceeded.

FIG. 3 shows a routing scheme 300 the DSGDL may use when a normal user available transaction type threshold is exceeded (e.g., performance and/or availability of the inventory master at the primary site becomes degraded). In traditional architectures, when services are overwhelmed all users experience the same level of degradation. Although there may be multiple user classes, for example, a first user may be identified as an elite user 132 while a second user may be identified as a normal user 134, when requests overwhelm available resources and begin to overload the data tier, both the elite user 132 and the normal user 134 experience degraded service at the same time (e.g., the service is either slow or unavailable for both user types). Overwhelmed resources and an overloaded data tier may eventually lead to a full outage where service becomes unavailable to all users.

The DSGDL differentiates users (132, 134), for example, by analyzing the users login, Internet protocol (IP) address, information about the device space (e.g., desktop, laptop, mobile device—smart phone and tablet PC, screen size) used by the user. Alternatively, the DSGDL leverages a label assigned by the application, e.g., status in a customer loyalty rewards or frequent flier program. The DSGDL classifies the type of user (132, 134), the transaction type (302, 304, 306, 308) engaged by the user and/or how the user is accessing a site. For example, the user may be searching for a listing of available television sets (302) or laptops (304) offered on a company's online website, or the user may be attempting to complete a transaction (e.g., purchase check out) (306), or the user may be attempting to update the user's profile (308). Alternatively, a user accessing content via a mobile device may not have the capability to display images and accordingly the mobile device does not require access to images.

The DSGDL classifies the users' transactions (e.g., available transaction requirement type 310, and consistent transaction requirement type 312), depending on what the user is attempting to do, in order to know how to route users and users' service requests. Available transaction requirement types 310 are time sensitive but may not need to rely on the most consistent data. For example, a user may be surfing the Internet for a list of available televisions for purchase and there may actually be 100 televisions available for purchase, the user may be satisfied with a returned result that simply indicates that 90 televisions are available for purchase and may not care that actually 100 televisions are available, but the user does care that the results are returned quickly.

The DSGDL generates and/or uses a unique label (e.g., the user's login, the IP address of the user's device) for a user so that the DSGDL may determine how to route service requests for different users. The DSGDL quantizes the user (132, 134), the transaction requirement types (310, 312), and the device (e.g., mobile, desktop, tablet) used by the user. The DSGDL may adaptively learn to recognize different transaction requirement types that differentiate in between the available transaction requirement type 310 and consistent transaction requirement type 312. The label assignment may be part of the client implementation within the application. Alternatively, the DSGDL may rely on the underlying service to assign the next label for use in reply by the service, and thus updating the label in an ongoing fashion.

For example, where a user is attempting to purchase a concert ticket, a search result may indicate whether concert tickets are available, a description of the venue, and a general description of the different classes of concert seats available. However, at the browsing stage, the user may not need to know whether a particular seat is available (e.g., a seat that is centrally located in the auditorium). During the browsing stage, the user may value a fast response over a precise answer indicating exactly the location of all available seats. Another transaction requirement type may be identified where the user desires to determine whether a particular seat (e.g., the center seat within the particular section) is available. In such a scenario, the user may be willing to wait longer for confirmation that the seat is available. However, when the user is checking out to purchase the seat (e.g., the desired seat of the section) the user is likely to be willing to wait even longer to confirm the transaction has completed and the user has successfully purchased the center seat (e.g., consistent transaction requirement type), because the user highly values accuracy that the purchase succeeds.

In another example, when a user is browsing for televisions, and the underlying inventory service determines that 1000 TVs remain in inventory, the replies by the service indicate a general notion that inventory is available because the service considers the possibility unlikely that simultaneous purchases will result in not enough TVs being available. Accordingly, the checkout process may sacrifice some data inconsistency in return for more speed, and simultaneous purchases of TVs to occur and the inventory adjusts after the fact. However, when the inventory falls to 100 TVs or fewer, the replies by the service may signal that inventory is low and additional (e.g., subsequent) queries of the inventory may need to be less sensitive to delay in return for added consistency guarantees upon checkout to ensure inventory is available. As a result when inventory is low, a purchase may result in a longer update to check the inventory is available than in the case when the inventory is high. Finally, when there is only one TV remaining in the inventory, strong guarantees may be imposed to ensure that simultaneous check-outs do not occur. In this case, a real-time adjustment of the labels published by the underlying service adjusts the trade-off between availability and consistency.

The DSGDL recognizes different gradations among transaction requirement types, user types (e.g., elite users and normal users), and different gradations of required data precision for the user to complete a transaction (e.g., a desktop machine may require more data to present a higher quality image than a mobile device).

The DSGDL may be implemented in a business-to-business configuration, where users are businesses (e.g., retailers) accessing the website of another business (e.g., cloud service provider and/or broker) with various service-level agreements (SLA's) for each of the users (e.g., Walmart®, Target®, mom and pop shop). The DSGDL may process service requests for different users (132, 134) according to SLAs for individual user types. The DSGDL distinguishes users based on various criteria and adapts over time to identify any number of distinguishing criteria for users in order to determine how to provide users with requested services. The DSGDL identifies service types (e.g., inventory, credit check, account verification, access authorization), user types, transaction types, and service quality types.

The DSGDL is an overlay that implements a set of virtual machines so that traffic directed to a site (102, 104, 106, 108) is first routed to a set of routing overlay nodes with DSGDL logic. The DSGDL logic may be implemented at each overlay node that inspect the traffic routed through the overlay nodes to determine how to prioritize each service request (e.g., routing priority requests to a priority queue) and determine to which service to route the service request. The DSGDL set of routing overlay nodes with DSGDL logic may be configured to route service requests to multiple equivalent services within a site and/or across sites.

FIG. 3 shows an inventory master data center 314 (e.g., with a failed primary site 316 and active metro site 318) that may have a similar implementation at secondary site 320 (e.g., more than a metro distance) with a secondary service 322 (e.g., inventory cache) that may not provide the same level of data consistency as the inventory master 316 or metro site 316. Secondary site 320 may provide availability (e.g., less delay) comparable or preferable to the inventory master 314 (e.g., depending on the transaction type 310, 312). Ideally, the secondary sites (e.g., secondary systems) may have a delay latency of between 5 milliseconds (ms) to 10 ms (e.g., Internet delay) or approximately 100 kilometer (km) geographical distance. The secondary sites (e.g., secondary systems) may also be farther than 10 ms delay or farther than 100 km.

The routing layer 324 (e.g., the overlay nodes with DSGDL logic) monitors the priority queue length (326, 328) (e.g., the total time to process service requests directed to a primary service). When the DSGDL notices the queue lengths exceed a configurable priority queue (e.g., identifies demand exceeding capacity), the DSGDL may provision additional services (e.g., secondary services 326) and redirects traffic to the secondary services (e.g., cache version 322, 326) at the secondary site (cloud 1 site 320) as needed. In the instance where a secondary service is located at a metro site 318, the DSGDL also recognizes whether a service request (e.g., of a particular transaction type) requires strict synchronization between the primary site 316 and the metro site 318. The DSGDL prioritizes elite users 132 over normal users 134 so that the DSGDL assigns the elite users to the high priority queues (340, 342) served with non-preemptive priority over the normal users assigned lower priority queues (344, 346). The DSGDL routes the requests based on user classes and transaction types. For example, normal users with available transaction requirement types may be assigned to a secondary service (e.g., cache system 320 with older data 322, 326) that may not be the metro site 318.

The DSGDL uses the user priority and transaction requirements (e.g., what is the user doing at the time of a service degradation and/or outage) to provide different levels of service to users. When the level of service begins to degrade, instead of everyone experiencing the same level of service degradation at the same time, the DSGDL uses the user priority and transaction requirements to sacrifice service performance for normal users 134 so that the expected level of service for preferred users (e.g., elite users 132) may be preserved (e.g., protected). For example, a normal user experiences service degradation or in an extreme case a normal user may be blocked from services during a service level degradation, while an elite user 132 and/or a user checking out 306 (e.g., completing a transaction) may be identified as more valued because a money transaction is occurring as opposed to someone who is merely browsing the website.

The DSGDL recognizes differentiated services, where a first user is accessing data from a website using a mobile device, and a second user is accessing data from the website using a desktop machine (e.g., home computer). The DSGDL may be configured to identify the second user (e.g., the home computer user) as a preferred user over the first user (e.g., the mobile device user) to provide as many of the services that are available (e.g., high quality images) during an outage degradation, because a home computer is more likely to realize a difference in quality of service over a mobile device. For example, the DSGDL may provide only textual data to a mobile-phone user during an outage and/or degradation of service because the mobile-phone user's experience is unlikely to be degraded by the lack of a high quality image.

The DSGDL captures as a label a user's classification (e.g., user type such as an elite user or normal user), a user's transaction requirement type (e.g., available or consistent), and differentiated services (e.g., the type of computing device a user is using such as a laptop, a desktop, mobile device—smart phone, tablet personal computer). For example, when the user (e.g., client-side) accesses services, the DSGDL adds a label to identify the user so that when the user makes a request the DSGDL knows how to process service requests, in particular when the environment is experiencing a degradation of services.

The user labels may be predefined using the user's name or login (e.g., retailer Walmart® uses label Walmart). The DSGDL may dynamically assign user labels (132, 134), using a model where the label or the mapping to the labels is updated by a control message from the DSGDL routing overlay. For example, when the DSGDL receives a service request, the DSGDL initially maps the service request to a transaction type and labels the transaction type as AVAILABLE 310 or CONSISTENT 312. The DSGDL may switch to a new label LOW when the inventory is low, because at that time of labeling the transaction type, when a user is browsing whether there are only 2 televisions (TVs) (e.g., products) remaining in stock as opposed to 102 makes a difference. The DSGDL may prioritize the transaction types in the order of CONSISTENT (checkouts 306), LOW (low inventory queries) and then AVAILABLE queries. The DSGDL may determine whether to label a transaction as LOW or AVAILABLE based on the item type requested in the query (e.g., get TVs 302 is LOW, but get Laptops 304 is not).

When a user logs in at the application tier 330, the DSGDL forwards a message that notifies the application of which label to use for the user (e.g., customer). The DSGDL dynamically signals an update in user status as soon as a user (e.g., customer) satisfies criteria (e.g., achieving elite status such as by frequency of purchases and/or a dollar amount of purchases).

The DSGDL may initially label requests from mobile devices MOBILE, and others devices as OTHER (e.g., the granularity and differentiation of the devices used by users may be dynamically updated as the DSGDL identifies different types of user devices). For example, the DSGDL may send an update that adds tablet to label TABLET when DSGDL provides a new service level for tablets.

The data center inventory master 314 (also referred to as primary data source) is an inventory of data (e.g., database) at the data tier (service layer 332) that houses the most consistent view of the data or the "single voice of truth". When the priority queue length (e.g., the sum of both the high and low priority queues for the master inventory) (326, 328) reach or exceed the normal user available transaction type threshold (e.g., signifying a level of performance degradation), the DSGDL may route (334) consistent transaction type service requests from both elite users and normal users to a metro site (318) (e.g., a mirror system with a copy of the inventory master from the primary site), and route (336) available transaction type service requests from elite users to the metro site 318 where a consistent (e.g., synchronized) copy of the inventory master 316 is located. The available transaction type service requests from normal users are routed (338) to a secondary service queue 322 (e.g., inventory cache cloud 1) at a secondary site 320 (e.g., a cache system that may be more than a metro site distance) where a less than consistent copy of the inventory master may reside.

Figure 4:
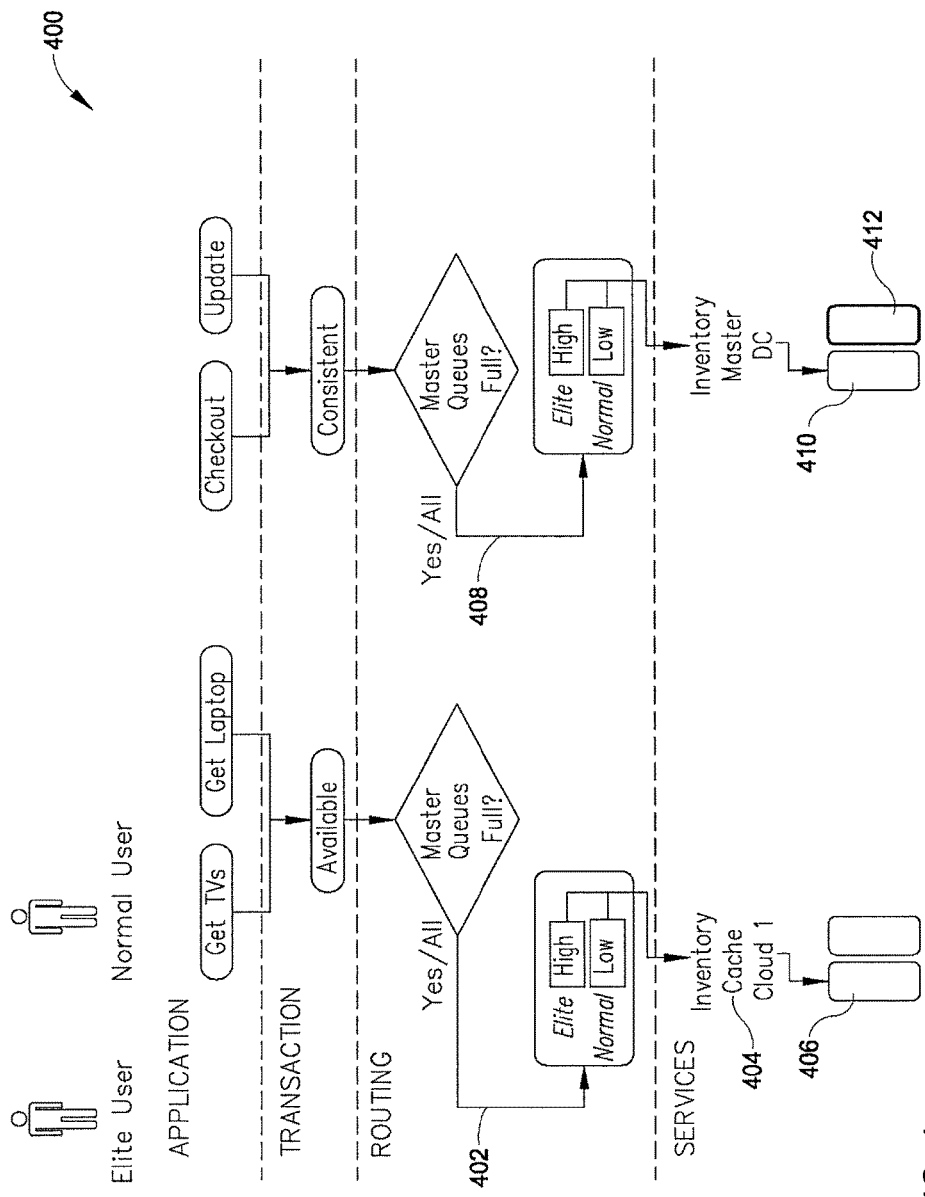
FIG. 4 shows a routing scheme the DSGDL may use when an all user available transaction types threshold is exceeded.

FIG. 4 shows a routing scheme 400 the DSGDL may use when an all user available transaction type threshold is exceeded (e.g., performance and/or availability of the inventory master at the primary site becomes further degraded). For example, when the priority queue length (e.g., the high and low priority queues for the master inventory) reaches or exceeds the all user available transaction type threshold (e.g., a level of performance degradation), the available transaction types from both the elite users and the normal users may be routed (402) to a secondary service (404) (e.g., inventory cache) hosted at cloud 1 (e.g., a cache system 406 that may be geographically located further than a metro site distance), while consistent transaction types from both the elite users may continue to be routed (408) to the inventory master services hosted at a metro site 410 (e.g., where the primary site 412 has failed over to the metro site 410).

Figure 5:
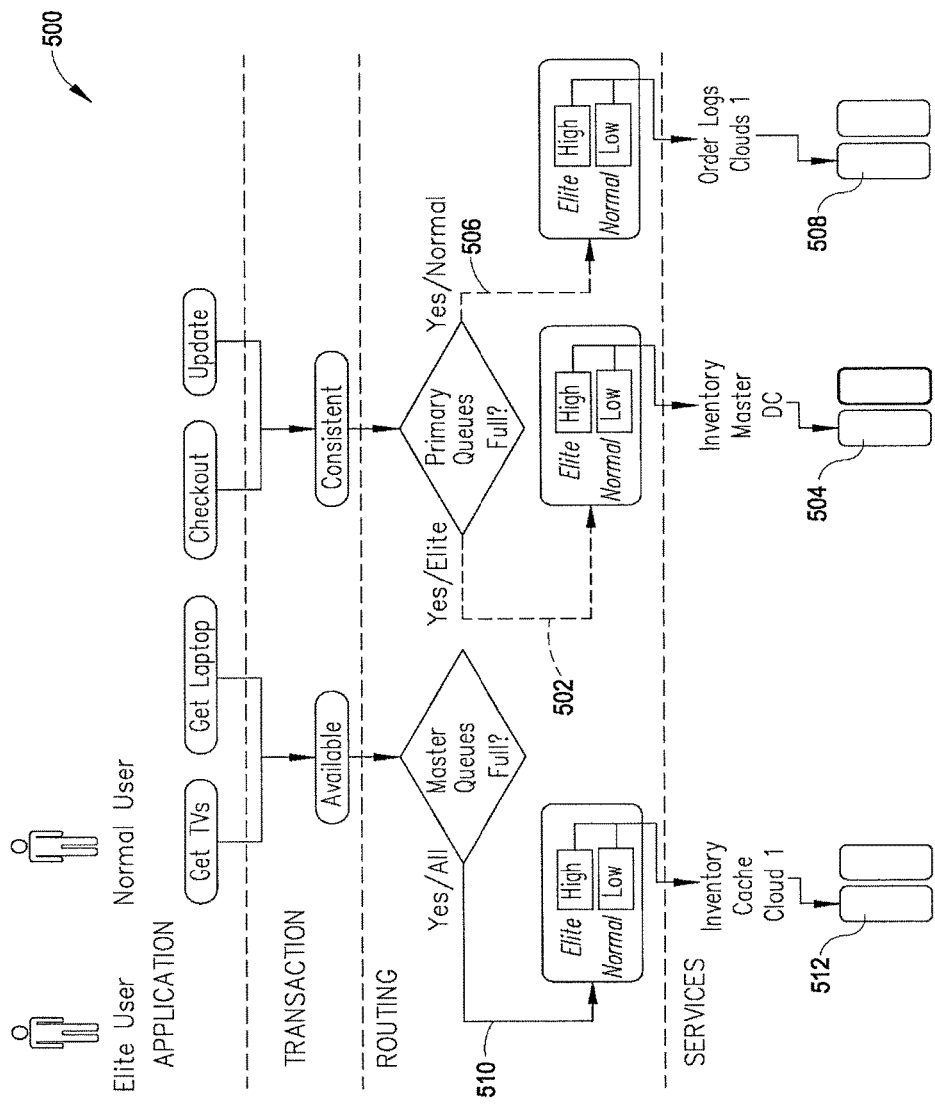
FIG. 5 shows a routing scheme the DSGDL may use when a normal user consistent transaction type threshold is exceeded.

FIG. 5 shows a routing scheme 500 the DSGDL may use when a normal user consistent transaction type threshold is exceeded. For example, when the priority queue length for a set of priority queues (e.g., the sum of both the high and low priority queues for the master inventory) reaches or exceeds the normal user consistent transaction type threshold (e.g., a level of performance degradation such as when the high priority queue is full), consistent transaction type service requests from elite users may continue to be routed 502 to the inventory master metro site 504 to retrieve/communicate data (e.g., read/write), while consistent transaction type service requests from normal users to write data (e.g., to the order logs) may be routed 506 to a secondary service (508) (e.g., hosted by cloud 1) and time stamped so that the system may play back the order logs at a later time (e.g., when the system has recovered from the performance degradation). The available transaction type service requests from both elite users and normal users may be routed (510) to a secondary service (512) (e.g., inventory cache) hosted by cloud 1 (e.g., a cache system that may be more than a metro site distance).

Figure 6:
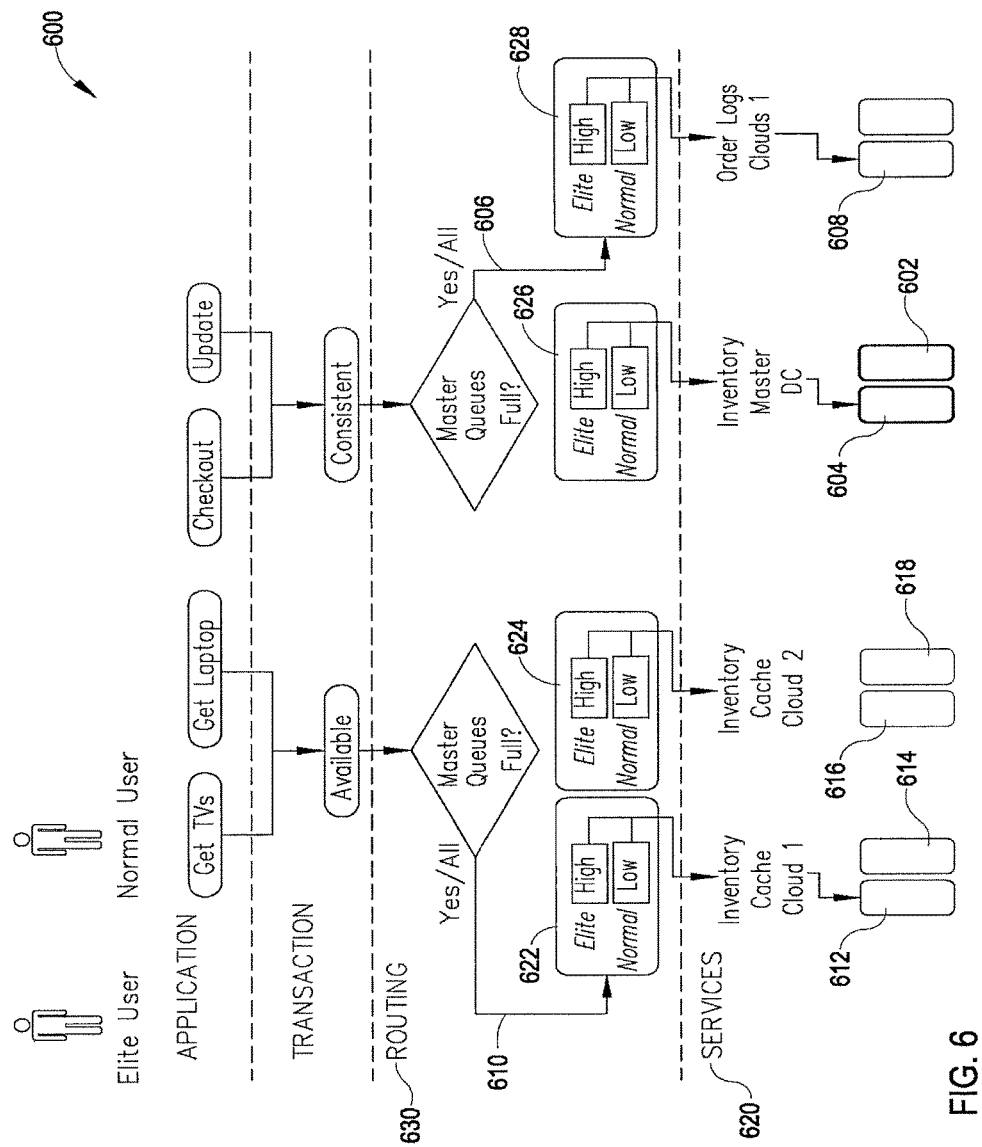
FIG. 6 shows a routing scheme the DSGDL may use when a primary service is unavailable.

FIG. 6 shows a routing scheme 600 the DSGDL may use when a primary service is unavailable (e.g., the primary system 602 and metro site 604 are unavailable and thus the master inventory service is unavailable) and/or when an all user all transaction types threshold is exceeded. When both the primary site 602 and metro site 604 are completely degraded, the DSGDL may route (606) consistent type service requests from both elite users and normal users to a secondary service 608 (e.g., order logs where service requests are logged and timestamp) hosted by cloud 1. Available type service requests from both elite users and normal users may be routed (610) to a secondary service 612 (e.g., inventory cache) hosted by cloud 1.

Because the secondary services (e.g., cache 612 and order logs 608) do not require synchronization of data using a primary site 602 or a metro site 604, the DSGDL may scale the secondary services to any number of cache systems (612, 614, 616, 618) (e.g., data centers—inventory cache cloud 1 and cloud 2) at any number of geographical locations and distances (e.g., beyond a metro site distance).

When the data tier (service layer 620) is overwhelmed, whether due to degradation within the infrastructure and/or the services servicing the data, the DSGDL may use any number of priority queues (622, 624, 626, 628) in order to satisfy the elite user's service requests. When the primary service is overwhelmed, the DSGDL processes higher priority requests before lower priority so that not all requests degrade the same. The DSGDL may use any number of classes of service (e.g., gold, silver, bronze) to provide elite users service during performance degradation.

DSGDL logic may be implemented at the data tier (service layer 620) (e.g., workers nodes) to interface with the DSGDL overlay (routing layer 630). The DSGDL logic at the data tier (service layer 620) lists the available queues (622, 62, 628) and checks the status of the queues to process the service requests. The DSGDL logic may be implemented as a queuing service (e.g., AMQP-compliant queuing services such as a cluster of VMWare's RabbitQM® servers) to determine which service (e.g., service queue) and/or sites (e.g., primary system site, metro-site, cache system, related system with a portion of the services of the primary system) to use to service a service request, and the priority of the service request.

The DSGDL may scale services within one site and scale across sites (e.g., secondary site) when service becomes more degraded. The DSGDL logic redirects traffic and dynamically provisions new services available at other sites (e.g., metro-sites, cache sites). Traditional approaches perform scaling using hardware and hardcoded logic within a service tier within a data center, but the DSGDL overlay allows scaling gradations across multiple services within a site and/or multiple other sites. The DSGDL turns sites on as needed. The DSGDL overlay may be implemented at each site with a queuing service (e.g., AMQP-compliant queuing services such as a cluster of VMWare's to use RabbitQM® servers) that replicates the DSGDL logic.

The DSGDL performs dynamic scaling to multiple sites. Because the DSGDL routing is implemented in software, the DSGDL is able to dynamically provision multiple sites as needed (e.g., scaling beyond predetermined sites and withstanding multiple site failures). DSGDL client side logic may be implemented at the application tier to label the users and the transaction types of service requests. The DSGDL may use a queuing service (e.g, an AMQP-compliant queuing service such as a cluster of VMWare's RabbitMQ® servers) as an overlay implemented at the data tier to route the service requests. Queues fill up when underlying service overloads. Even as priority queues triage access to the primary service, DSGDL routing dynamically redirects service requests to secondary services as needed. The DSGDL may leverage SQLFire's® ability to dynamically provision additional cached data within and across sites to repair and/or augment a primary site, and dynamically provision secondary (e.g., less consistent sites—more than a metro distance from the primary site).

The synchronization of a primary site and metro site may be costly, because the configuration may have been built to a particular capacity. However, using the DSGDL overlay, services may be dynamically scaled at runtime to cheaper sites (e.g., geographic locations beyond a metro site distance). When the geographical dependency is removed (e.g., deploying to geographic locations beyond a metro site distance) including time and data synchronization requirements, then services may be scaled dynamically whenever and wherever needed. Secondary services hosted at a location beyond a metro site may be less synchronized (e.g., data is a little out of date) in order to provide some functionality (e.g., browsing website) to the user rather than no functionality due to a performance degradation. The DSGDL prioritizes service requests so that the DSGDL routes service requests that the DSGDL identifies as least impacted by time and data synchronization requirements (e.g., lower priority service requests) to secondary services hosted at a location beyond a metro site. The DSGDL offers more differentiated services by classifying the user type, the transaction requirements types, identifying the status and capacity of each service request queue.

The DSGDL may continuously analyze the queues to avoid performance degradation (e.g., indicated by the length of priority queues), such as when the delay in response time is degraded (e.g., 5 seconds or greater) at the primary site. In order to facilitate the elite users (e.g., avoid the situation where the users stop browsing and/or shopping), the DSGDL preemptively redirects (e.g., to a metro site—mirrored real-time data consistency) the service requests early enough to satisfy the elite users' requirements. Accordingly, although normal users may experience faster response times when accessing a cache system (e.g., less synchronized data), when the DSGDL determines the elite users may be impacted by performance degradation the DSGDL preemptively redirects (e.g., to a metro site with mirrored real-time data consistency) the service requests early enough to satisfy the elite users' requirements.

The DSGDL routing connects to underlying services using queue length as an indication of service health and service availability. The DSGDL may determine which secondary service of multiple secondary services to direct a service request based on the best available response time of the secondary services and/or consistency of the data available to the service (e.g., one service may have more consistent data than another service although both services are less consistent than the primary site). The DSGDL may use a configurable transaction time threshold as an acceptable amount of elapsed time for a transaction to complete (e.g., within 250 milliseconds based on an SLA or knowing that users will not stand for longer than that value). The DSGDL may use a transaction time threshold that the DSGDL sets for each request based on an ongoing measurement of the round-trip-time to complete the request. For example, the DSGDL may continuously monitor the response time, and set the transaction time threshold to be no longer than the maximum, or no longer than the 99th percentile, or no longer than double the maximum.

The performance degradation of the priority queues for the inventory master service may be determined by the DSGDL using the queue lengths as an indirect measure that the underlying service is overwhelmed. When the underlying service does not have enough capacity to meet demand, the corresponding set of priority queues will back up. When the corresponding set of priority queues of the underlying service remains overloaded, the response times for the set of priority queues will continue to be long. As such, the DSGDL detects the event that 1) the queue length exceeds some threshold (e.g., a normal user available transaction type threshold, an all user available transaction type threshold, a normal user consistent transaction type threshold, and an all user all transaction types threshold), and 2) when the queue length continues to be long, an indirect measure of performance degradation.

For example, the DSGDL may set an event to trigger when the queue length of the high priority queue of a set of priority queues reaches a length of 100, or when the total number of requests in the queues exceeds a length of 100. The setting of the length at which to trigger is a measure of how long the difference in demand and capacity occur. Alternatively, the DSGDL may set the queue length to 1000, which indicates that the difference in demand and capacity needs to be sustained longer before the DSGDL detects that the service is degraded.

For example, the DSGDL may set a trigger value to scale services and/or route requests, by relating the queue length to the utilization and the capacity. Specifically, the DSGDL may model the relation between utilization and capacity as an M/M/c queuing system. Using a stationary solution, the DSGDL determines that there are c servers (e.g., c sqlFire® 1.X database servers in site 1) each with service rate $\mu$. The combined arrival rate from all the traffic is $\lambda$, and the utilization of the system is $\rho$. The set of $\pi_k$ equations represent the stationary distribution for an M/M/c system that is the probability that the combined requests in the queue is length k (e.g., $\pi_0$ is the fraction of time the queues are empty). The DSGDL may solve the set of equations completely. As such, the DSGDL may relate the probability that the queue exceeds some threshold to the utilization $\rho$ and the number of servers c. So that for 3 servers and a desire to be at least 90% sure that when there is only 50% utilization left then the DSGDL sets the system with c=3, $\rho$=0.5, and solves for the smallest value of k so that $1-(\pi_1+\pi_2+ \ldots +\pi_k)>0.9$. The DSGDL may set a trigger value to scale services and/or route requests for different queue lengths and for different levels of assurance (e.g., 90%) and the number of worker nodes (c).

The DSGDL may use logic based on the length of the queues. For example, the DSGDL may evaluate the highest priority queue as the M/M/c formulation above, and for the next queue, evaluate the total number of items in the highest priority queues. The DSGDL may use the weights as well to count as multiple numbers of items in the queue instead of just as 1. The weight denotes added service time of that type of request. For example, when the DSGDL determines that the consistent requests take 2 times as long, the DSGDL may use a weight of 2 for the consistent requests. The DSGDL may use more levels of granularity to determine the performance degradation of the queues (e.g., 4 levels of priority upon which to stage degradation).

Alternatively, instead of using the actual queues to indicate when a service is overwhelmed, the DSGDL may use virtual queues with a service rate set $\alpha\mu$, less than the actual rate $\mu$ (so that $0<\alpha<1$). Accordingly, as a new request arrives, the DSGDL may simultaneously increment the virtual queue and en-queue the request into the physical queue. The DSGDL logic may concurrently decrement the length of the virtual queue with the amount of requests that would have been processed by a service with rate $\alpha\mu$, and use the length of the virtual queue to check whether the thresholds are exceeded. One implementation of virtual queues may use counters that track the queue length. Using the virtual queue, the DSGDL may detect when the rate of arrivals exceeds a service rate $\alpha\mu$ instead of using the physical queues that detect a rate $\mu$. For example, if $\alpha$=0.8, the virtual queue begins to fill up when the demand is at or above 80%.

Currently, hardware based load balancers (e.g., Cisco Systems) may provide routing schemes for Internet traffic and priority queuing of data packet transmissions. However in contrast to data packet routing performed by hardware based load balancers, the DSGDL performs priority queuing and routes service requests (e.g., in contrast to Internet data packets) requested by users (e.g., consumers) and between services in the computing architecture. The DSGDL performs priority queuing and routes service requests using software running over virtual machine nodes (e.g., RabbitMQ®), rather than hardware, so that the solution may be implemented dynamically for cloud-based environments without modifying the existing services. Moreover, the configurations may be changed via the software interface without hardware changes. The DSGDL provides priority queuing and service request routing at the application layer using virtual machines, rather than traditional approaches that provide network layer solutions using hardware. Therefore, the DSGDL is more scalable and more dynamically configurable than traditional hardware solutions.

The DSGDL provides a way for elite users to delay experiencing performance degradation until the DSGDL has taken all other measures to avoid the elite users from experiencing the performance degradation. When the DSGDL identifies a priority queue and a metro site (e.g., mirror site of the primary) as unavailable for the elite users, the DSGDL routes consistent transaction type service requests to a secondary service that records (e.g., create order logs) the consistent transaction type service requests to play the service requests back to complete the transaction when a priority queue becomes available at the primary site and/or a metro site.

The DSGDL routing may consider any number of classes of service requests. Expedited forwarding (EF) requests that are time-sensitive. EF queues are serviced with high priority, but are short (because out of date requests are no longer viable). Best Effort (BE) requests (e.g., transferring a file, the integrity of the file content is more important than the time to complete the transfer) must be consistent and acknowledged. BE queues do not need to be serviced immediately, but BE queues must be are captured. Available transaction and Consistent transaction types, map to EF and BE respectively. Other types of service types may be considered such as urgent or emergency shutdown (e.g., given the highest priority).

Figure 7:
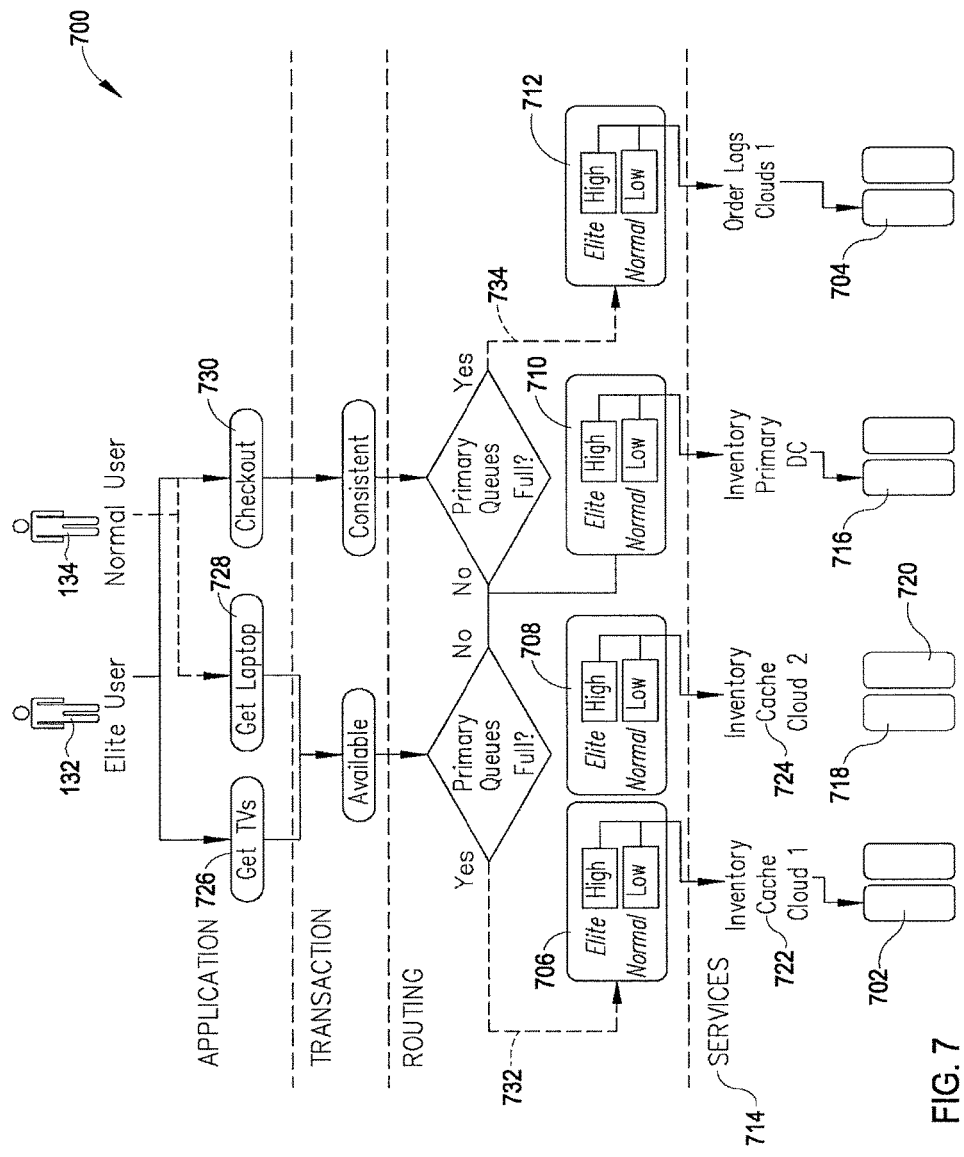
FIG. 7 shows a routing scheme the DSGDL may use for an inventory service.

FIG. 7 shows a routing scheme 700 the DSGDL may use for an inventory service. The DSGDL provides on-demand cached data 702 (e.g., secondary service) that provides scalable secondary options for available access to the primary inventory. Order logs 704 (e.g., secondary service) offer scalable secondary capability for capturing requests with consistent requirements. In the absence of secondary options, the DSGDL preserves higher priority requests by blocking lower priority requests.

Priority queues (706, 708, 710, 712) sit in front of each underlying service tier/data tier (714) (e.g., worker nodes) within a site. Each service subscribes to a set of queues. Services (702, 704) may consume from the higher priority queue with strict non-preemptive priority before proceeding to consume from the next priority. Each worker node within a service tier (data tier) (714) consumes from the shared high and low priority queues (706, 708, 710, 712) (e.g., a set of queues each for the inventory primary, cache on cloud 1, cache on cloud 2, and order logs). The PDG system assigns requests from elite users and normal users to the high and low priority queues, respectively.

Dynamic routing determines which service to use (e.g., the primary 716 or a secondary service 702, 704). The DSGDL routing layer monitors queue lengths to check whether a service is overloaded. When a service is overloaded, the DSGDL automatically provisions secondary services (702, 704) and redirects requests to alleviate demand on the primary service 716. The underlying services may also monitor associated queues and provision additional capacity (718, 720) within a particular service. The routing may be hierarchical and the DSGDL may not need to know the details within other sites or within an underlying service in order to function. The DSGDL provisions and redirects traffic to secondary services in cloud 1 (722) and cloud 2 (724) when the primary service in the data center is overwhelmed.

The DSGDL uses transaction labels to describe the user status and type of requests. FIG. 7 shows elite users 132 and normal users 134, as well as available requests (726, 728) and consistent requests (730) for database query and updates respectively. The DSGDL may label an elite user's service request "Get Laptop" (728) as "INVENTORY.ELITE.AVAILABLE" to designate the <service>.<user status>.<request type>. During periods of limited capability the DSGDL may use these labels to classify and redirect service based on user status (e.g., 132, 134) and request type.

The DSGDL employs dynamic label-switched routing to achieve differentiated service-based graceful degradation by directing requests as needed. By default, the DSGDL directs requests to the primary inventory (e.g., primary service) since the primary inventory offers the most consistent view. When queue lengths of the primary service back up, the DSGDL spins-up the secondary data cache service and redirects to the secondary service INVENTORY.NORMAL.AVAILABLE requests.

When queues in the primary service continue to back-up, the DSGDL redirects INVENTORY.*.AVAILABLE requests (732) (e.g., "*" denotes wild where all values are valid) to the secondary service. When queues in the secondary service back-up or the site is down, the DSGDL spins up additional sites and redirects requests according to the labels. Similarly, the DSGDL scales-up secondary order log services to satisfy INVENTORY.*.CONSISTENT requests (734). The DSGDL provides mechanisms to enforce priority, to provision secondary services on-the-fly, and to redirect requests.

The DSGDL may provide functionality to an online store (e.g., electronics store) under heavy load and in the presence of node and site failures to gracefully degrade based on a prioritization of user types and transaction types. Under heavy loads and in the presence of node and site failures, the DSGDL detects unusual request buildup in the priority queues. When the DSGDL detects unusual request buildup in the priority queues, the DSGDL provisions secondary services to which the DSGDL routing dynamically redirects requests. While the DSGDL routing dynamically redirects requests, the compromised primary service may repair itself by provisioning additional nodes. Throughout this process, the online electronics store is able to provide continued access to users and service requests. Available responses remain within acceptable latency limits as requests of normal users, and when the DSGDL redirects elite users and normal users to the secondary services. The DSGDL provides a way for consistent requests to continue to access the primary service as long as possible, especially those from elite users, so that users do not experience catastrophic failures.

Figure 8:
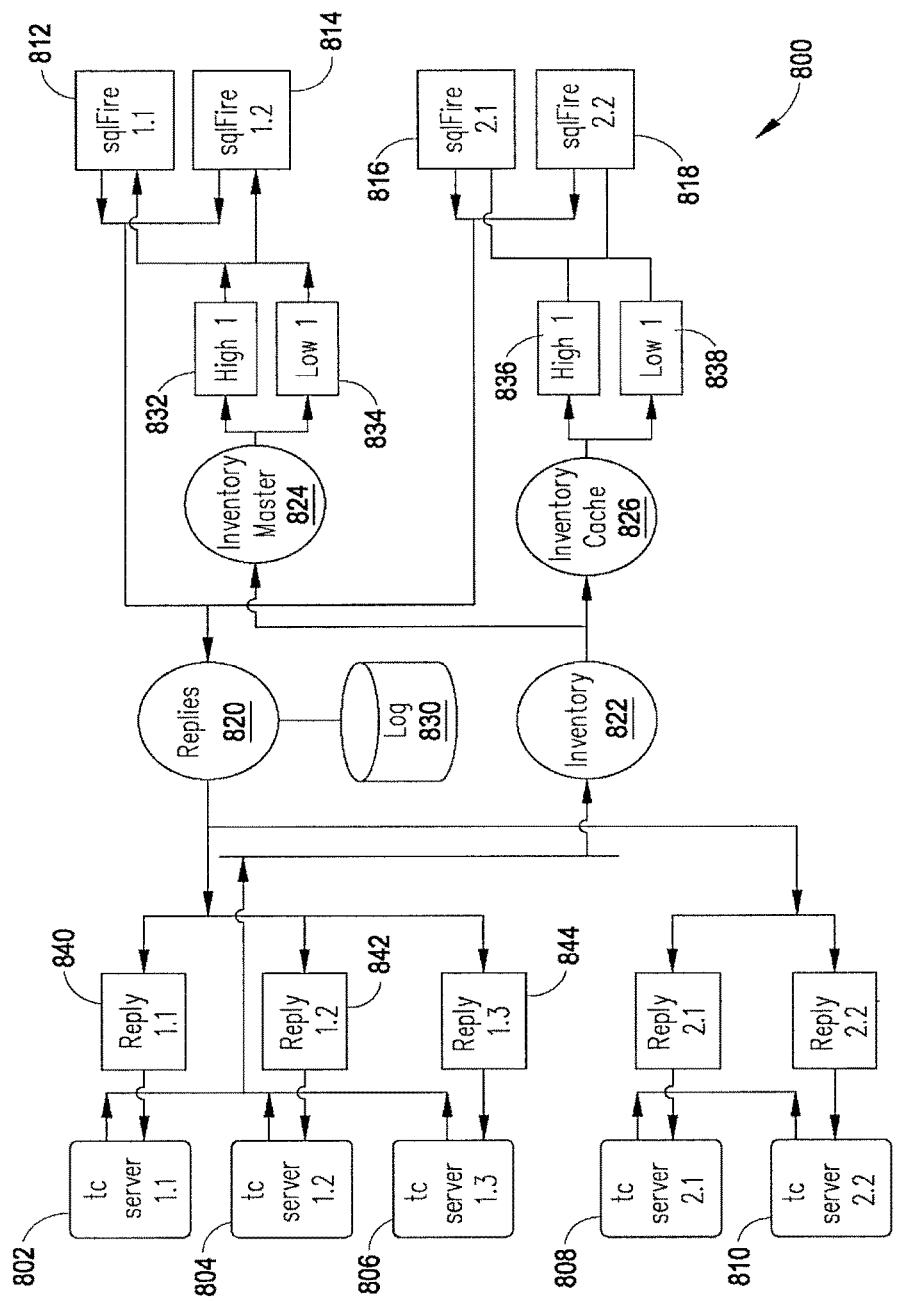
FIG. 8 shows a routing topology the DSGDL may use to route service requests.

FIG. 8 shows a routing topology 800 the DSGDL may use to route service requests. The routing topology 800 shows a message path of service requests between the interfaces on the application (tc) servers (802, 804, 806, 808, 810) at the application tier and the inventory servers (812, 814, 816, 818) (e.g., SQLFire®) at the data tier. The interfaces (820, 822) to the tc servers and the SQLFire servers allow the tc server (802, 804, 806, 808, 810) and SQLFire nodes (812, 814, 816, 818) to consume and publish messages to the routing overlay. The interfaces (820, 822) may connect directly to the routing cluster(s) (824, 826) within the same site. All nodes in a cluster know the worker nodes within that site. For example, all routing cluster nodes in site 1 know of all the tc server 1.x and SQLFire 1.x nodes.

Upon publishing a message (e.g., service request), via the interface, the message is passed to a routing cluster node and examined. For example, when tc server 1.1 (802) publishes a message for the inventory, the DSGDL logic forwards the message to a routing cluster node (824) in site 1. When the routing cluster node fails the DSGDL logic retries with another routing cluster node (826). When the DSGDL logic detects a failure in the transmission via the routing layer, the interface (820, 822, 830) gracefully and seamlessly handles retries.

Similar for routing nodes across sites, the routing node that receives the message knows of the available services (e.g., inventory master and inventory cache). The receiving routing node knows (e.g., determines and/or retrieves) the queue lengths of all services. The receiving routing node may not know the queue contents for other sites. Based on the queue length data, and the message label, the routing rules may determine to which service to route the message. Upon directing the service request to a particular service, the DSGDL logic routing rules place the service request into the appropriate queue (832, 834, 836, 838) based on the label of the service request (e.g., elite user or normal user available transaction types, elite user or normal user consistent transaction type).

The queues associated with the nodes (e.g., the DSGDL layer RabbitMQ® clusters) are also hosted on the cluster within that site. For example, site 1's routing cluster nodes host the queues Reply 1.x (840, 842, 844) (each associated to tc server 1.x), and High 1 and Low 1 queues (832, 834) (shared by SQLFire 1.x cluster). The consuming interface checks the routing nodes in the cluster to consume the message.

The body of the message (e.g., service request) may contain a field that specifies the sender. The SQLFire node(s) for the application server tc server 1.1 (802) uses the sender information to address and label the reply. The DSGDL may implement for each tc server one reply queue per service (e.g., alternatively a set of multiple reply queues with different priorities per service may be implemented). The DSGDL may send the reply message to all sites, and those sites without the corresponding queue disregard the message.

Figure 9:
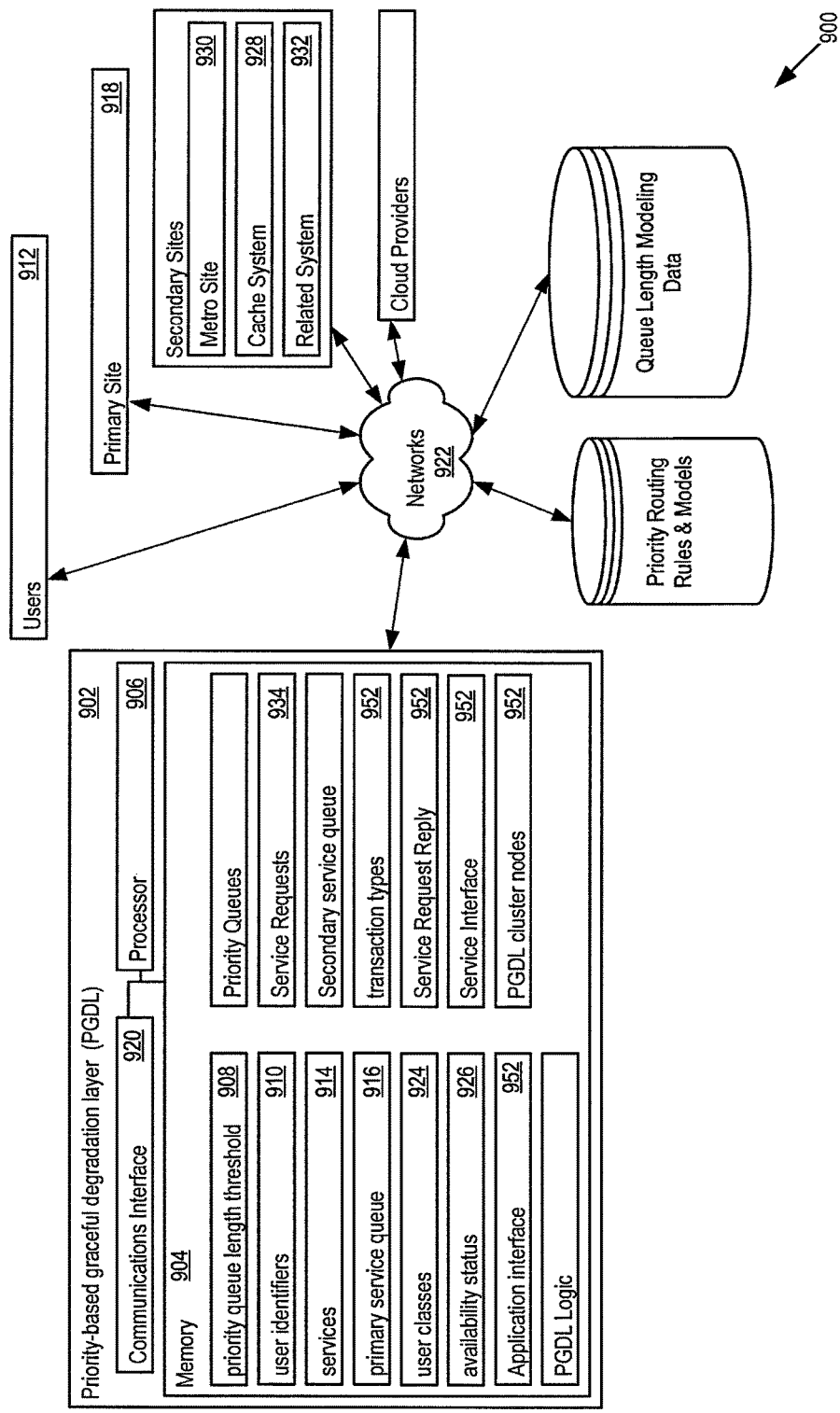
FIG. 9 shows components of a DSGDL system.

FIG. 9 shows components 900 of a DSGDL system 902. The differentiated service-based graceful degradation layer (DSGDL) implements a system 902 that includes a memory 904 coupled to a processor 906. The memory 904 includes a priority queue length threshold 908, a plurality of user identifiers 910 uniquely identifying a plurality of users 912, and at least one of a plurality of services 914, including a primary service set of priority queues 916 that stores data used by a primary system 918. The DSGDL system 902 is in communications with various components via a communication interface 920 coupled to a network 922 (e.g., Internet). The DSGDL receives a plurality of user classes 924 an/or service requests 934 for a service 914 provided over a cloud computing environment. The service 914 uses a database (e.g., stored on the primary service priority queues 916 or another service priority queues) used by the primary system 918. The DSGDL receives a plurality of transaction types 920 for each transaction request received from the user classes 924 for the service 914, and determines an availability status 926 of the service 914. Based on the determined health of the service, the DSGDL dynamically creates either: a cache system 928, wherein the cache system is configured to provide an older copy of the data stored in the database of the service 914, or a mirror system 930 (e.g., metro site) including a database consistent with the database of the service 914, or a related system 932 configured to provide at least a portion of the service 914 offered by the primary system 918, or any combination thereof. The DSGDL dynamically routes the plurality of transaction types 920 based on the user classes 924, the plurality of transaction types 920, and the availability status 926 of the service 914 to the primary system 918, the cache system 928, the mirror system 930, and the related system 932.

Figure 10:
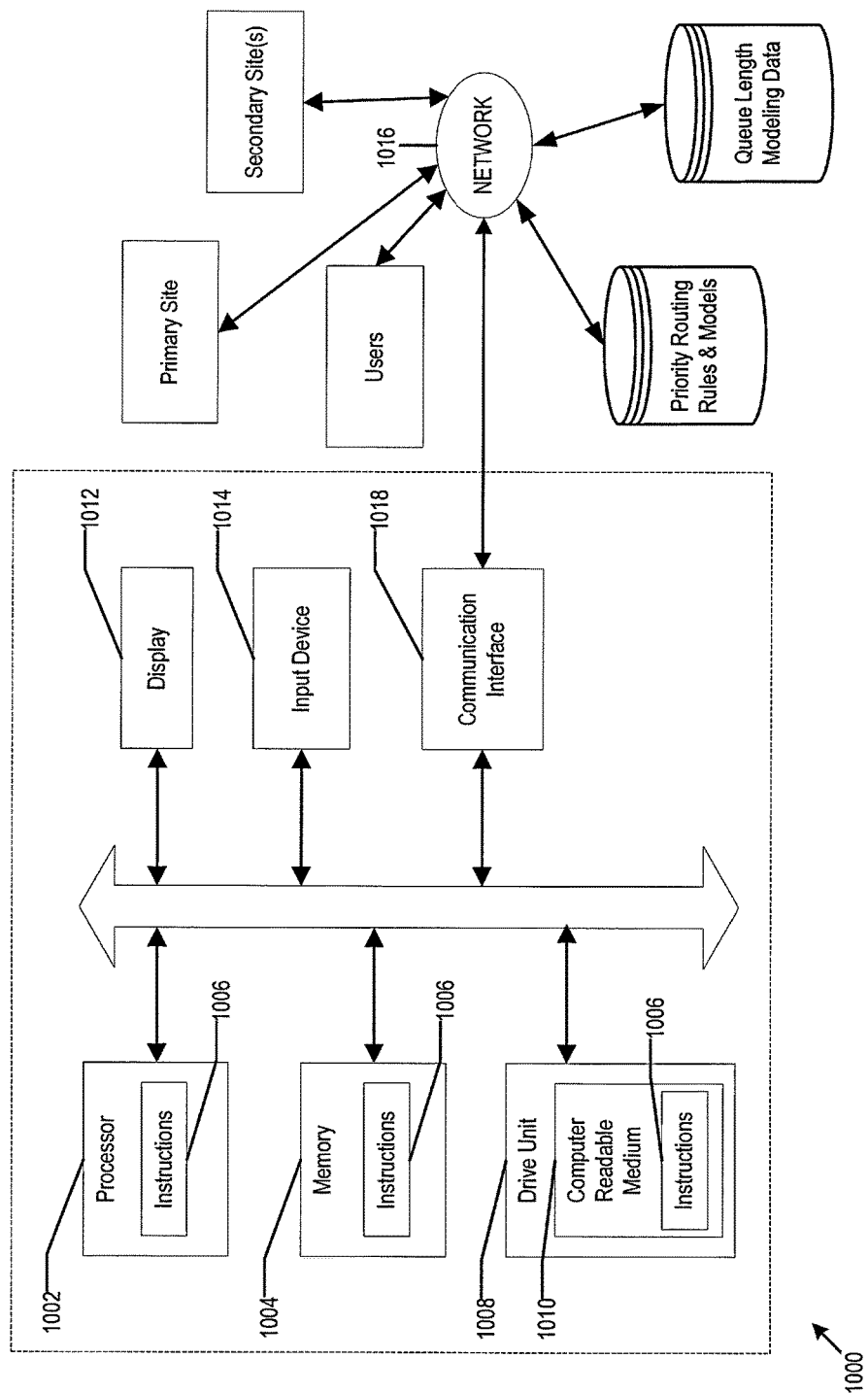
FIG. 10 shows a DSGDL system configuration.

FIG. 10 shows a DSGDL system configuration 1000. The DSGDL system may be deployed as a general computer system used in a networked deployment. The computer system may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a processor 1002, such as, a central processing unit (CPU), a graphics processing unit (GPU), or both. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processors and memories discussed herein, as well as the claims below, may be embodied in and implemented in one or multiple physical chips or circuit combinations. The processor may execute a software program, such as code generated manually (i.e., programmed).

The computer system may include a memory 1004 that can communicate via a bus. The memory may be a main memory, a static memory, or a dynamic memory. The memory may include, but may not be limited to computer readable 1010 storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions 1006 executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display 1012, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit 1008.

Additionally, the computer system may include an input device 1014 configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network 1016 may communicate voice, video, audio, images or any other data over the network. Further, the instructions may be transmitted or received over the network via a communication interface 1018. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. Likewise, the additional connections with other components of the DCBR system 102 may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A product comprising:
a computer readable memory with processor executable instructions stored thereon, wherein the instructions when executed by the processor cause the processor to:
store, in one or more memories:
a set of queue thresholds, including a priority queue threshold,
user identifiers each uniquely identifying a user,
service requests for at least one service, and
a set of priority queues storing the service requests;
receive a plurality of user classes associated with the service requests, respectively, for the at least one service, wherein the at least one service is a primary service provided by a primary system;
identify a plurality of transaction types for the service requests;
determine an availability status of the at least one service based on the priority queue threshold;
based on the determined availability status of the at least one service, dynamically create at least one cache system, wherein the at least one cache system is configured to provide an older copy of data stored in at least one database for the at least one service;
detect a degradation in a capability of the primary system;
assign an assigned service request from the service requests to at least one secondary system based on at least one of user classes or transaction types;
dynamically route, from the primary system to one or more assigned secondary systems, the assigned service request corresponding to a select group of user classes;
calculate a response time to route a service request for the primary service to the primary system;
determine when the response time, for the service request for the primary service exceeds the priority queue threshold;
dynamically provision a secondary system to provide the primary service; and
route the service request for the primary service to the secondary system.

2. The product of claim 1, wherein the assigned one or more secondary systems comprise:
the at least one cache system,
at least one logging system configured to store data changes in at least one database for the primary service,
at least one mirror system,
at least one related system, or
a combination thereof; and
wherein the assigned one or more secondary systems is located within 5 to 10 milliseconds (ms) transmission time of the primary system.

3. The product of claim 1, wherein a user class of the plurality user classes is selected from the group consisting of:
an elite user class assigned to high priority users; and
a normal user class assigned to normal priority users.

4. The product of claim 1, wherein the transaction types are selected from the group consisting of:
an elite user available transaction type assigned to a low priority queue;
an elite user consistent transaction type assigned to a high priority queue;
a normal user available transaction type assigned to a low priority queue; and
a normal user consistent transaction type assigned to a high priority queue.

5. The product of claim 1, wherein the primary system and the one or more assigned secondary systems comprise;
computing nodes that subscribe to the set of priority queues that determine a performance and availability of at least one of plurality of service queues.

6. The product of claim 5, wherein the computing nodes comprise at least one Advanced Message Queuing Protocol (AMQP)-compliant queuing system.

7. The product of claim 1, wherein the primary system, or the one or more assigned secondary systems, or both provide the at least one service over a cloud computing environment.

8. A method comprising:
receiving a plurality of user classes for at least one service provided over a cloud computing environment, wherein the at least one service is provided by a primary system;
receiving a plurality of transaction types for each transaction request received from the plurality of user classes for the at least one service;
determining an availability status of the at least one service;
based on a determined health of the at least one service, dynamically provisioning at least one cache system, wherein the cache system is configured to provide an older copy of the data stored in the at least one database for the at least one service;
detecting a degradation in a capability of the primary system;
assigning an assigned transaction request to at least one secondary system based on at least one of user classes or transaction types;
dynamically routing, from the primary system to one or more assigned secondary systems, the assigned transaction request corresponding to a select group of user classes;
calculating a response time to route a transaction request for a primary service to the primary system;
determine when the response time for the transaction request for the primary service exceeds the priority queue threshold;
dynamically provision a secondary system to provide the primary service; and
route the transaction request for the primary service to the secondary system.

9. The method of claim 8, wherein the one or more assigned secondary systems comprise:
the at least one cache system;
at least one logging system configured to store data changes in at least one database for the primary service;
at least one mirror system;
at least one related system;
a combination thereof; and
wherein the one or more assigned secondary systems is located within 5 to 10 milliseconds transmission time of the primary.

10. The method of claim 8, wherein a user class of the plurality user classes is selected from the group consisting of:
an elite user class assigned to high priority users; and
a normal user class assigned to normal priority users.

11. The method of claim 8, wherein the transaction types are selected from the group consisting of:
an elite user available transaction type assigned to a low priority queue;
an elite user consistent transaction type assigned to a high priority queue;

a normal user available transaction type assigned to a low priority queue; and a normal user consistent transaction type assigned to a high priority queue.

12. The method of claim 8, wherein the primary system and the one or more assigned secondary systems comprise:
computing nodes that subscribe to the set of priority queues that determine a performance and availability of at least one of plurality of service queues.

13. The method of claim 12, wherein the computing nodes comprise at least one Advanced Message Queuing Protocol (AMQP)-compliant queuing system.

14. The method of claim 8, wherein the primary system, or the one or more assigned secondary systems, or both provide, the at least one service over a cloud computing environment.

* * * * *

UNITED STATES PATENT AND TRADEMARK OFFICE
CERTIFICATE OF CORRECTION

PATENT NO. : 10,110,425 B2
APPLICATION NO. : 14/706460
DATED : October 23, 2018
INVENTOR(S) : Teresa Tung et al.

Page 1 of 1

It is certified that error appears in the above-identified patent and that said Letters Patent is hereby corrected as shown below:

In the Claims

In Column 22, Claim 5, Line 4: delete ";" at the end of the line and replace with --:--

Signed and Sealed this
Twenty-fourth Day of September, 2019

Andrei Iancu
*Director of the United States Patent and Trademark Office*